(12) United States Patent
Sinharay et al.

(10) Patent No.: US 12,018,989 B2
(45) Date of Patent: Jun. 25, 2024

(54) MULTI-SENSORY TECHNIQUES FOR MEASURING AVERAGE TEMPERATURE OF MIXED FLUID INSIDE A CHAMBER

(71) Applicant: Tata Consultancy Services Limited, Mumbai (IN)

(72) Inventors: Arijit Sinharay, Kolkata (IN); Rajat Kumar Das, Kolkata (IN); Anwesha Khasnobish, Kolkata (IN); Tapas Chakravarty, Kolkata (IN); Arpan Pal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 397 days.

(21) Appl. No.: 17/436,062

(22) PCT Filed: Apr. 21, 2020

(86) PCT No.: PCT/IB2020/053763
§ 371 (c)(1),
(2) Date: Sep. 2, 2021

(87) PCT Pub. No.: WO2020/217168
PCT Pub. Date: Oct. 29, 2020

(65) Prior Publication Data
US 2022/0178768 A1 Jun. 9, 2022

(30) Foreign Application Priority Data

Apr. 22, 2019 (IN) .............................. 201921015850

(51) Int. Cl.
*G01K 11/24* (2006.01)
*G01K 3/06* (2006.01)
(Continued)

(52) U.S. Cl.
CPC ................ *G01K 11/24* (2013.01); *G01K 3/06* (2013.01); *G01K 13/026* (2021.01); *G01K 11/26* (2013.01)

(58) Field of Classification Search
CPC ........ G01K 11/24; G01K 3/06; G01K 13/026; G01K 11/26
See application file for complete search history.

(56) References Cited

U.S. PATENT DOCUMENTS 3,807,222 A * 4/1974 Eggers ................ G01N 29/032
73/590
4,265,125 A * 5/1981 Mahany .................... G01P 5/24
73/861.23
(Continued)

FOREIGN PATENT DOCUMENTS

EP 1328801 11/2004
WO WO 2002/016924 A1 2/2002

OTHER PUBLICATIONS

Author: Thomas D. Varberg, Bradley W. Pearlman, Ian A. Wyse, Samuel P. Gleason, Dalir H. P. Kellett, and Kenneth L. Moffett. Title: Determining the Speed of Sound and Heat Capacity Ratios of Gases by Acoustic Interferometry Title of the item: Journal of Chemical Education Date: Oct. 2017 Publisher: ACS Link: https://pubs.acs.org/doi/pdf/10.1021/acs.jchemed.7b00526.

(Continued)

*Primary Examiner* — Nathaniel T Woodward
*Assistant Examiner* — Philip L Cotey
(74) *Attorney, Agent, or Firm* — FINNEGAN, HENDERSON, FARABOW, GARRETT & DUNNER LLP

(57) ABSTRACT

Temperature measurement is an important part of many potential applications in the fields of metallurgy. Conventional temperature measurement methods do not provide accurate and precise average temperature of fluid inside an (Continued)

enclosed chamber. The present disclosure provides multi-sensory techniques for measuring average temperature of mixed fluid inside a chamber. The average temperature is measured based on acoustic interferometry technique on standing wave and inputs received from one or more sensors and radar. The present disclosure utilizes radar to compensate the effect of fumes, noise based on Doppler effect. Further, the inputs received from the one or more sensors are used to determine the concentration of one or more fluids present in the chamber. The method of proposed disclosure depends on the principle of dependence of temperature on sound speed in fluid. So, measurement of sound speed can be mapped to report average temperature of mixed fluid inside the chamber.

9 Claims, 8 Drawing Sheets

(51) Int. Cl.
*G01K 13/02* (2021.01)
*G01K 11/26* (2006.01)

(56) References Cited

U.S. PATENT DOCUMENTS

| | | | | |
|---|---|---|---|---|
| 4,848,924 A * | 7/1989 | Nuspl | ................... | G01K 11/24 367/901 |
| 5,060,507 A * | 10/1991 | Urmson | ............... | G01N 29/024 73/61.49 |
| 5,173,704 A * | 12/1992 | Buehler | ................ | G01S 13/003 342/26 D |
| 5,767,407 A * | 6/1998 | Sinha | .................... | G01N 29/52 73/61.79 |
| 6,116,080 A * | 9/2000 | Logue | .................... | G01N 29/50 73/24.05 |
| 8,893,320 B2 * | 11/2014 | Klicpera | ............... | G01F 15/024 4/615 |
| 9,847,217 B2 * | 12/2017 | Morrisroe | ................. | F23G 5/10 |
| 9,989,423 B2 * | 6/2018 | Gleeson | ................ | G01K 11/22 |
| 11,473,424 B2 * | 10/2022 | Cerrahoglu | ........... | E21B 47/135 |
| 2002/0105999 A1 * | 8/2002 | Wallen | ................... | G01K 11/24 374/117 |
| 2005/0210965 A1 * | 9/2005 | Sinha | ................... | G01N 29/036 73/61.79 |
| 2014/0338423 A1 * | 11/2014 | Buckland | ............... | G01N 29/02 73/24.01 |
| 2017/0280237 A1 * | 9/2017 | Kopetz | ................ | H04R 19/005 |
| 2017/0350878 A1 * | 12/2017 | Holmes | ................. | G01N 33/50 |
| 2019/0025136 A1 * | 1/2019 | Burkhardt | ............. | G01N 27/08 |
| 2020/0072680 A1 * | 3/2020 | Phan Le | ................ | G01K 11/24 |
| 2021/0238983 A1 * | 8/2021 | Singh | ..................... | E21B 47/18 |
| 2021/0349484 A1 * | 11/2021 | Konrad | .................. | G01K 17/10 |
| 2021/0356431 A1 * | 11/2021 | Sai | ............................ | G01F 1/74 |

OTHER PUBLICATIONS

International Search Report for PCT/IB20/53763 dated Sep. 16, 2020.

Written Opinion of the International Search Authority for PCT/IB20/53763 dated Aug. 27, 2020.

* cited by examiner

MULTI-SENSORY TECHNIQUES FOR MEASURING AVERAGE TEMPERATURE OF MIXED FLUID INSIDE A CHAMBER

CROSS REFERENCE TO RELATED PATENT APPLICATIONS AND PRIORITY

This application is a U.S. National Stage Filing under 35 U.S.C. § 371 and claims priority from International Application No. PCT/IB2020/053763 filed on Apr. 21, 2020, which application claims priority under 35 U.S.C. § 119 from Indian Application No. 201921015850, filed on Apr. 22, 2019. The entire contents of the aforementioned applications are incorporated herein by reference.

TECHNICAL FIELD

The disclosure herein generally relates to field of measuring temperature, more particularly, to multi-sensory techniques for measuring average temperature of mixed fluid inside a chamber.

BACKGROUND

Improvement in quality standards, for many metallurgical and other industrial applications utilizing enclosed fluid chambers such as foundry, industrial boiler, glass/ceramic manufacturing plants, chemical process, is a necessity. It is observed that better process control such as maintaining optimal temperature of mixed fluid inside a chamber improves product quality and reduces emission of gases. Further, by maintaining optimal temperature of fluid chambers, hotspots and thermal shocks are prevented. Furthermore, maintaining optimal temperature of mixed fluid inside a chamber using a non-contact based system ensures worker and plant safety by providing highly accurate instantaneous temperature from any location within the chamber. Thus, accurate and consistent temperature measurement of the mixed fluid inside the chambers is necessary to improve quality standards.

Conventional methods utilize Infrared (IR) thermometer for measuring temperature of the mixed fluid inside a chamber based on a phenomenon that every form of matter with temperature above absolute zero emits infrared radiation according to its temperature. However, the limitation of using Infrared (IR) thermometer is that many bodies emit less radiation at the same temperature. Thus, emissivity which depicts the relation between real emissive power and that of a blackbody, needs to be determined beforehand. Further, conventional methods utilize acoustic pyrometry based on time of flight (ToF) based measurement. Acoustic pyrometry based on ToF based measurement utilizes a principle that the velocity of sound through a medium is related to the temperature of the medium in a travelling wave scenario. However, ToF based principle has inherent issues regarding low Signal to Noise (S/N).

SUMMARY

Embodiments of the present disclosure present technological improvements as solutions to one or more of the above-mentioned technical problems recognized by the inventors in conventional systems. For example, in one aspect, there is provided a processor implemented method, comprising: generating, by exciting a first transducer in a frequency sweep mode, a sound signal to be transmitted to a second transducer in a mixed fluid medium inside a chamber. In an embodiment, the first transducer is a speaker and the second transducer is a microphone. In an embodiment, the method further comprising generating, based on transmission of the sound signal, a superimposed standing wave signal between the first transducer and the second transducer; analyzing, using an acoustic interferometry technique, one or more features of the superimposed standing wave signal to obtain a value of average velocity of the sound signal in the mixed fluid medium inside the chamber. In an embodiment, the one or more features of the superimposed standing wave signal include peak to peak based resonance difference. Further, the method comprising determining, using one or more sensors, concentration of one or more fluids present inside the chamber; computing, using one or more look up tables, a theoretical value of the velocity of sound signal inside the fluid chamber based on the concentration of the one or more fluids at different temperatures; and determining average temperature of the mixed fluid in the chamber by comparing the theoretical value and the obtained value of sound signal.

In an embodiment, the method further comprising continuously determining an updated temperature of the mixed fluid in the chamber by identifying a presence of at least one of (i) noise, (ii) fumes, (iii) turbulence in the chamber based on a shift in frequency of a radar. In an embodiment, the presence of at least one of (i) noise, (ii) fumes, (iii) turbulence in the chamber is identified by comparing the shift in the frequency of the radar with a pre-determined threshold.

In another aspect, there is provided a system comprising: a memory storing instructions; one or more communication interfaces; and one or more hardware processors coupled to the memory through the one or more communication interfaces, wherein the one or more hardware processors are configured by the instructions to generate, by exciting a first transducer in a frequency sweep mode, a sound signal to be transmitted to a second transducer in a mixed fluid medium inside a chamber. In an embodiment, the first transducer is a speaker and the second transducer is a microphone. In an embodiment, the one or more hardware processors are further configured by the instructions to generate, based on transmission of the sound signal, a superimposed standing wave signal between the first transducer and the second transducer; analyze, using an acoustic interferometry technique, one or more features of the superimposed standing wave signal to obtain a value of average velocity of the sound signal in the mixed fluid medium inside the chamber. In an embodiment, the one or more features of the superimposed standing wave signal include peak to peak based resonance difference. Further, the one or more hardware processors are configured by the instructions to determine, using one or more sensors, concentration of one or more fluids present inside the chamber; compute, using one or more look up tables, a theoretical value of the velocity of sound signal inside the chamber based on the concentration of the one or more fluids at different temperatures; and determine average temperature of mixed fluid in the chamber by comparing the theoretical value and the obtained value of sound signal.

In an embodiment, the one or more hardware processors are further configured by the instructions to continuously determine an updated temperature of the mixed fluid in the chamber by identifying a presence of at least one of (i) noise, (ii) fumes, (iii) turbulence in the chamber based on a shift in frequency of a radar. In an embodiment, the presence of at least one of (i) noise, (ii) fumes, (iii) turbulence in the chamber is identified by comparing the shift in the frequency of the radar with a pre-determined threshold.

In yet another aspect, there are provided one or more non-transitory machine readable information storage mediums comprising one or more instructions which when executed by one or more hardware processors cause generating, by exciting a first transducer in a frequency sweep mode, a sound signal to be transmitted to a second transducer in a mixed fluid medium inside a chamber. In an embodiment, the first transducer is a speaker and the second transducer is a microphone. In an embodiment, the instructions may further cause generating, based on transmission of the sound signal, a superimposed standing wave signal between the first transducer and the second transducer; analyzing, using an acoustic interferometry technique, one or more features of the superimposed standing wave signal to obtain a value of average velocity of the sound signal in the mixed fluid medium inside the chamber. In an embodiment, the one or more features of the superimposed standing wave signal include peak to peak based resonance difference. Further, the instructions may further cause determining, using one or more sensors, concentration of one or more fluids present inside the chamber; computing, using one or more look up tables, a theoretical value of the velocity of sound signal inside the chamber based on the concentration of the one or more fluids at different temperatures; and determining average temperature of mixed fluid in the chamber by comparing the theoretical value and the obtained value of sound signal.

In an embodiment, the instructions may further cause continuously determining an updated temperature of the mixed fluid in the chamber by identifying a presence of at least one of (i) noise, (ii) fumes, (iii) turbulence in the chamber based on a shift in frequency of a radar. In an embodiment, the presence of at least one of (i) noise, (ii) fumes, (iii) turbulence in the chamber is identified by comparing the shift in the frequency of the radar with a pre-determined threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
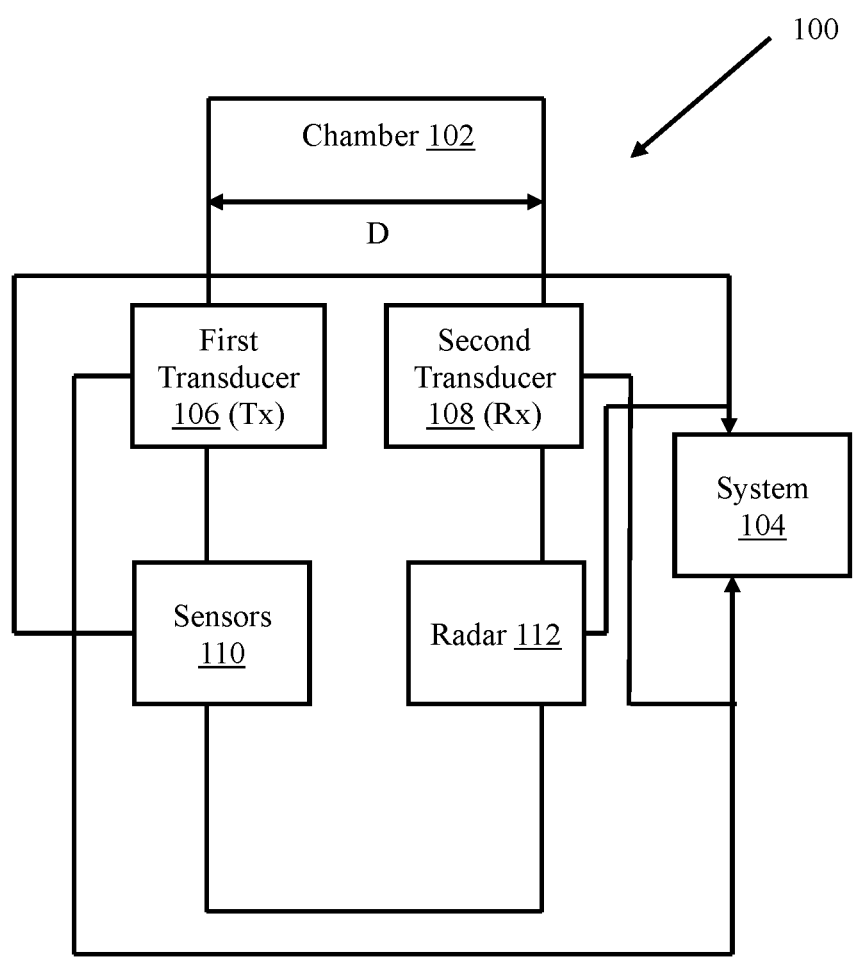
FIG. 1 illustrates an exemplary chamber environment with a system for implementing multi-sensory techniques for measuring average temperature of mixed fluid inside a chamber, in accordance with an embodiment of present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide multi-sensory techniques for measuring average temperature of mixed fluid inside a chamber. The typical interpretation of results obtained from conventional temperature measurement methods has been modified to solve a problem of accurately measuring temperature of fluid within an enclosed chamber that contains mixture of different compositions. The method of the present disclosure proposes multi-sensory techniques for measuring average temperature of mixed fluid inside a chamber. In the method of present disclosure, an average temperature is measured based on acoustic interferometry technique on standing wave along with receiving inputs from one or more sensors and radars to compensate the foreground noise turbulence, fumes. For acoustic interferometry, a transmitter and a receiver are used, wherein the transmitter radiates a focused sound beam towards the receiver. The one or more sensors help in determining percentage presence of each fluid present in the chamber. The method of proposed disclosure depends on the principle of dependence of temperature on sound speed in fluid. So, measurement of sound speed can be mapped to report average temperature of mixed fluid inside the chamber.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 illustrates an exemplary chamber environment 100 with a system 104 for implementing multi-sensory techniques for measuring average temperature of mixed fluid inside a chamber, in accordance with an embodiment of present disclosure. The chamber environment 100 utilizes a first transducer 106, a second transducer 108, one or more sensors and a radar, mounted inside a chamber 102 for measuring average temperature of mixed fluid inside the chamber 102. In an embodiment, the first transducer 106, the second transducer 108, the one or more sensors and the radar, mounted inside the chamber 102 may reside in the system 104 and make it act as a standalone unit. The system 104 is configured to process and analyze the data received from the first transducer 106, the second transducer 108, the one or more sensors and the radar to measure average temperature of mixed fluid inside the chamber. The system 104 is configured to process and analyze the received data in accordance with a temperature measurement module, further explained in conjunction with FIG. 2.

Figure 2:
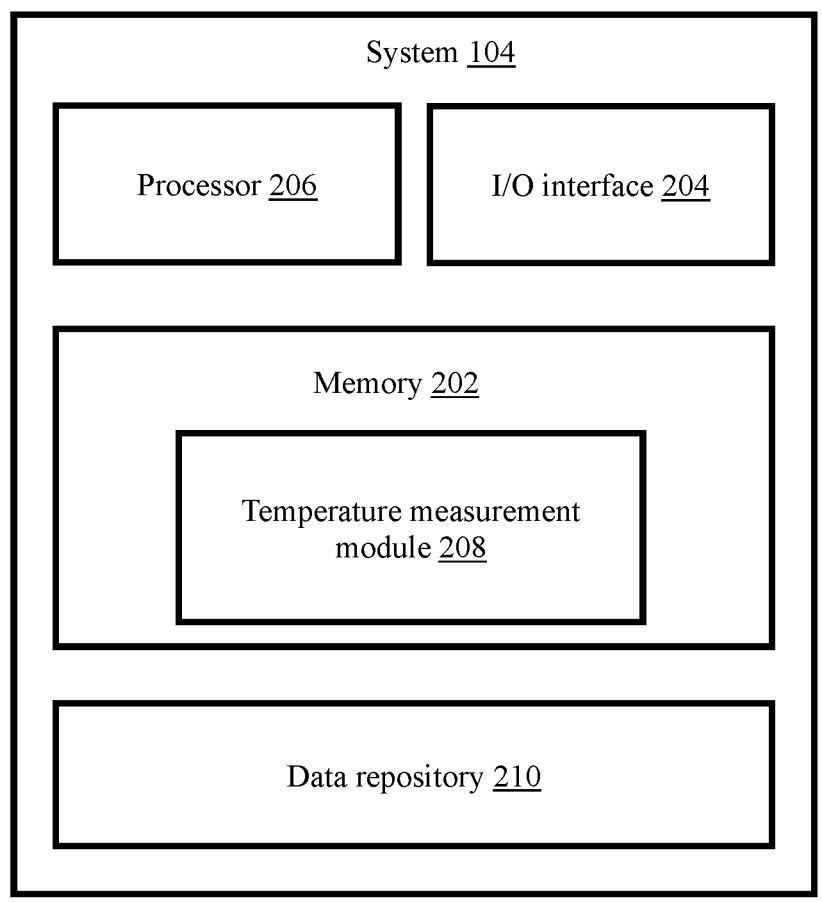
FIG. 2 illustrates a block diagram of the system of FIG. 1 for multi-sensory techniques for measuring average temperature of mixed fluid inside a chamber, according to some embodiments of the present disclosure.

FIG. 2 illustrates a block diagram of the system 104 of FIG. 1 for multi-sensory techniques for measuring average temperature of mixed fluid inside the chamber 102 of FIG. 1, according to some embodiments of the present disclosure.

In an embodiment, the system 104 includes or is otherwise in communication with one or more hardware processors such as a processor 206, an I/O interface 204, at least one memory such as a memory 202, and a temperature measurement module 208. In an embodiment, the temperature measurement module 208 can be implemented as a standalone unit in the system 104. In another embodiment, the temperature measurement module 208 can be implemented as a module in the memory 202. The processor 206, the I/O interface 204, and the memory 202, may be coupled by a system bus.

The I/O interface 204 may include a variety of software and hardware interfaces, for example, a web interface, a graphical user interface, and the like. The interfaces 204 may include a variety of software and hardware interfaces, for example, interfaces for peripheral device(s), such as a keyboard, a mouse, an external memory, a camera device, and a printer. The interfaces 204 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 204 may include one or more ports for connecting a number of computing systems with one another or to another server computer. The I/O interface 204 may include one or more ports for connecting a number of devices to one another or to another server.

The hardware processor 206 may be implemented as one or more microprocessors, microcomputers, microcontrollers, digital signal processors, central processing units, state machines, logic circuitries, and/or any devices that manipulate signals based on operational instructions. Among other capabilities, the hardware processor 206 is configured to fetch and execute computer-readable instructions stored in the memory 202.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 202 includes the temperature measurement module 208 and a repository 210 for storing data processed, received, and generated by the temperature measurement module 208. The temperature measurement module 208 may include routines, programs, objects, components, data structures, and so on, which perform particular tasks or implement particular abstract data types.

The data repository 210, amongst other things, includes a system database and other data. The other data may include data generated as a result of the execution of the temperature measurement module 208.

In an embodiment, the temperature measurement module 208 can be configured to perform multi-sensory techniques for measuring average temperature of mixed fluid inside a chamber which can be carried out by using methodology, described in conjunction with FIG. 2 through and use case examples.

Figure 3:
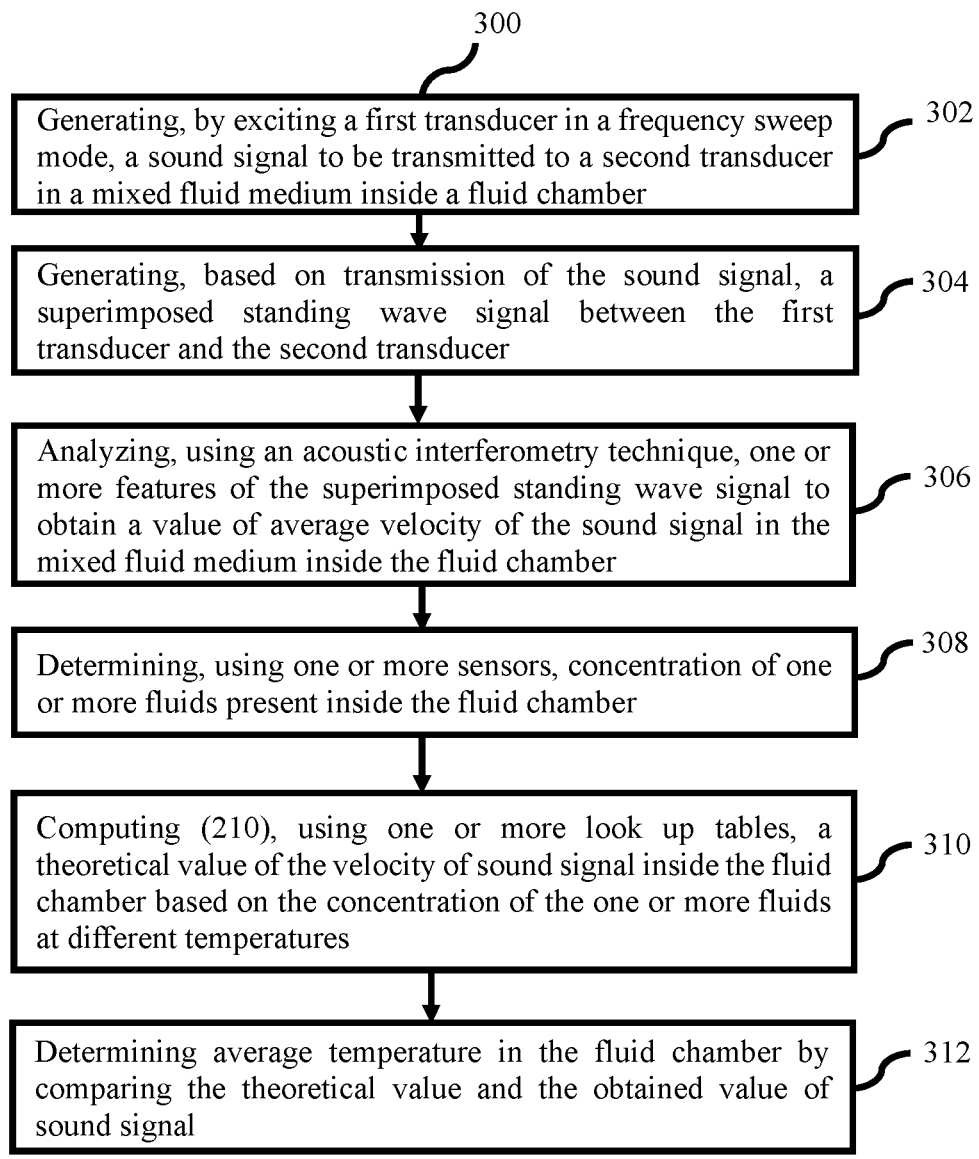
FIG. 3 illustrates an exemplary flow diagram of a processor implemented method for multi-sensory techniques for measuring average temperature of mixed fluid inside a chamber, in accordance with some embodiments of the present disclosure.
Figure 4:
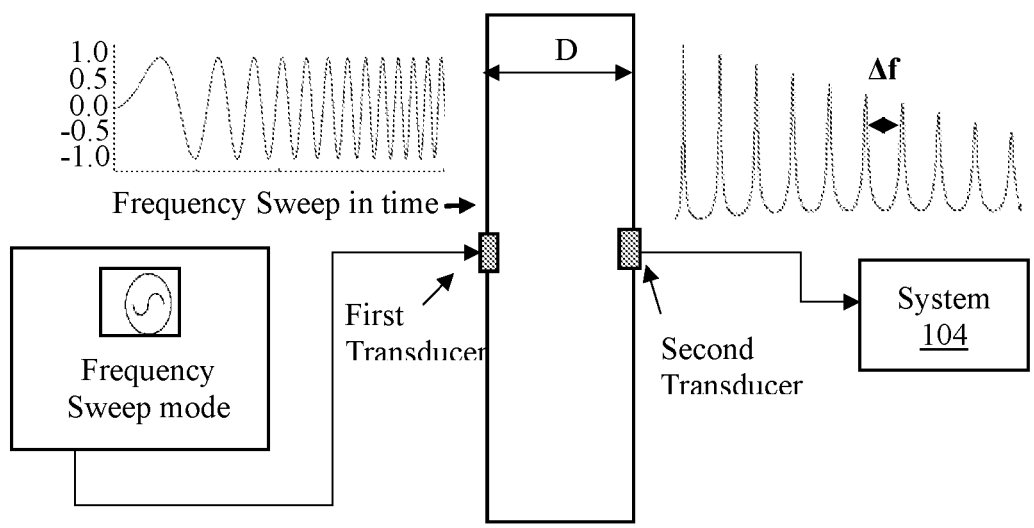
FIG. 4 illustrates a functional diagram depicting acoustic interferometry based measurement for measuring average temperature of mixed fluid inside a chamber, in accordance with some embodiments of the present disclosure.

FIG. 3, illustrate an exemplary flow diagram of a processor implemented method 300, implemented by the system 104 of FIG. 1 and FIG. 2 for measuring average temperature of mixed fluid inside a chamber using the temperature measurement module 208 of FIG. 2, in accordance with some embodiments of the present disclosure. Referring to FIG. 3, at step 302, the one or more hardware processors 206 are configured to generate, by exciting a first transducer in a frequency sweep mode, a sound signal to be transmitted to a second transducer in a mixed fluid medium inside a chamber. Here, the frequency sweep mode refers to application of a sine wave to first transducer, wherein the frequency of the applied sine wave is stepped through in time over a frequency range with appropriate hold time at each step. In an embodiment, frequency sweep measurement is carried out using Vector network analyser. In an embodiment, the first transducer is a speaker and the second transducer is a microphone. As can be seen in FIG. 4, the first transducer is excited in a frequency sweep mode with a sine wave having start frequency (say 2.5 MHz), step frequency (say 1 KHz) and stop frequency (say 4.5 MHz). In an embodiment, a sound signal generated as a result of exciting the speaker in the frequency sweep mode is shown in FIG. 4 (at the first transducer side). Further, the generated sound signal is transmitted to the second transducer in a mixed fluid medium inside the chamber. In an embodiment, the mixed fluid medium inside the chamber may comprise but not limited to one or more gases, one or more liquids, and combination of gases and liquids. Further, as depicted in step 304 of FIG. 3, the one or more hardware processors 206 are configured to generate, based on transmission of the sound signal, a superimposed standing wave signal between the first transducer and the second transducer. In an embodiment, the superimposed standing wave signal is formed based on transmission of the generated sound signal by the first transducer to the second transducer and further back transmission of the signal received by the second transducer towards the first transducer. Thus, the superimposed standing wave signal is an output spectrum formed as a result of to and fro transmission of sound signal between the first and second transducer. In other words, the output spectrum is a standing wave comprising of nodes and antinodes due to two opposite direction waves superimpose on each other. A superimposed standing wave signal between the first transducer and the second transducer is shown in FIG. 4 (at the side of the second transducer). In an embodiment, the superimposed signal comprises peak points and valley points, wherein peak points are used to depict resonance and valley points to depict anti-resonance. Here, valley points based anti-resonance difference represent the antinodes.

Figure 5:
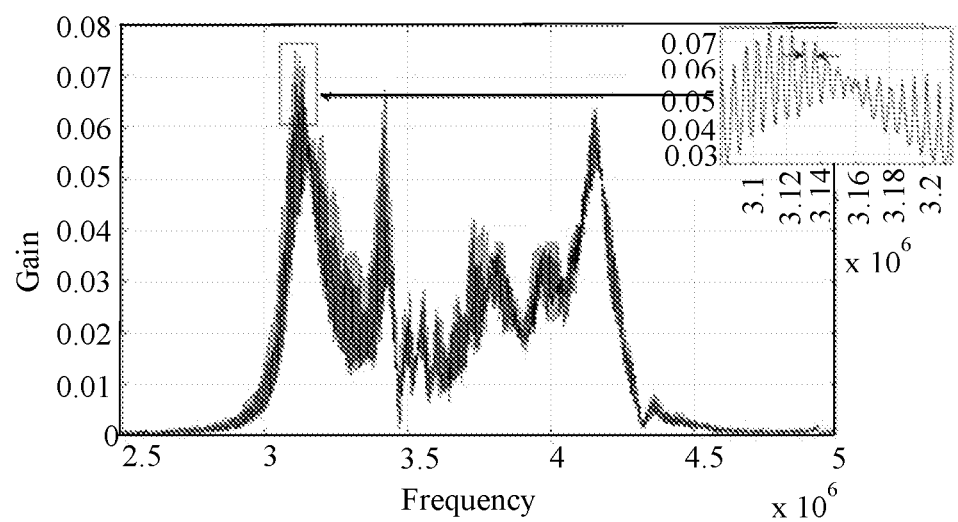
FIG. 5 illustrates a graph depicting results of frequency domain analysis on the signal received by the second transducer, in accordance with some embodiments of the present disclosure.

Further, at step 306 of FIG. 3, the one or more hardware processors 206 are configured to analyse, using an acoustic interferometry technique, one or more features of the superimposed standing wave signal to obtain a value of average velocity of the sound signal in the mixed fluid medium inside the chamber. In an embodiment, the one or more features of the superimposed standing wave signal include peak to peak based resonance difference. As can be seen in FIG. 4, the peak to peak based resonance difference is represented by $\Delta f$. FIG. 4 illustrates a functional diagram for acoustic interferometry based measurement for measuring average temperature of mixed fluid inside a chamber, in accordance with some embodiments of the present disclosure. In an embodiment, the peak to peak based resonance difference is derived from the superimposed standing wave signal based on a frequency domain analysis. FIG. 5 illustrates a graph depicting results of frequency domain analysis on the signal received by the second transducer, in accordance with some embodiments of the present disclosure. As can be seen from FIG. 5, a part of the signal received by the second transducer (shown in the bounding box) is extracted as the superimposed signal to derive peak to peak based resonance difference. In an embodiment, the value of average velocity of the sound signal (Alternatively referred as measured average velocity) is obtained based on the peak to peak based resonance difference ($\Delta f$) and dimensions of chamber (D) as shown in equation (1) below as:

$$V_{av} = 2 * D * \Delta f \qquad (1)$$

Figure 6A:
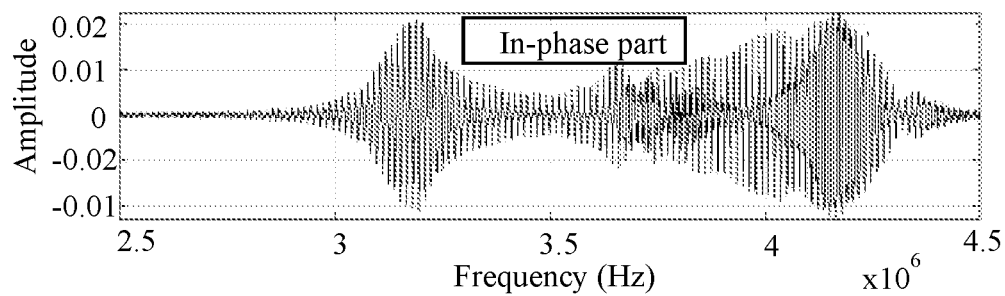
FIGS. 6A and 6B illustrate graphs depicting in-phase part and quadrature part respectively of the signal received by the second transducer, in accordance with some embodiments of the present disclosure.
Figure 6B:
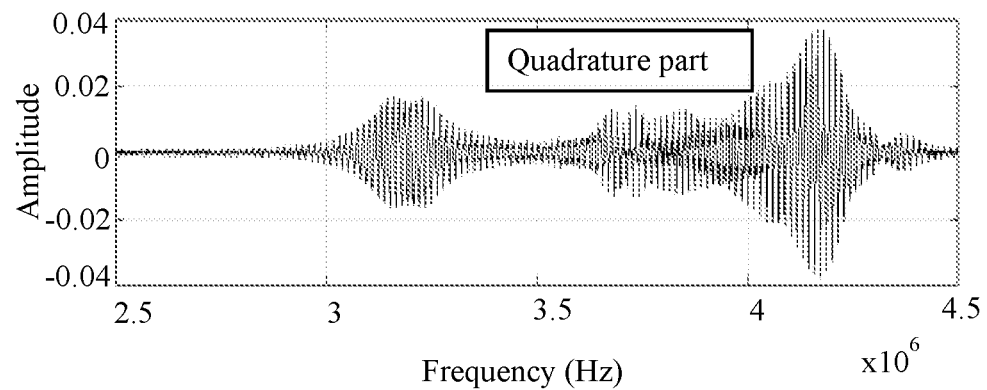
Figure 7:
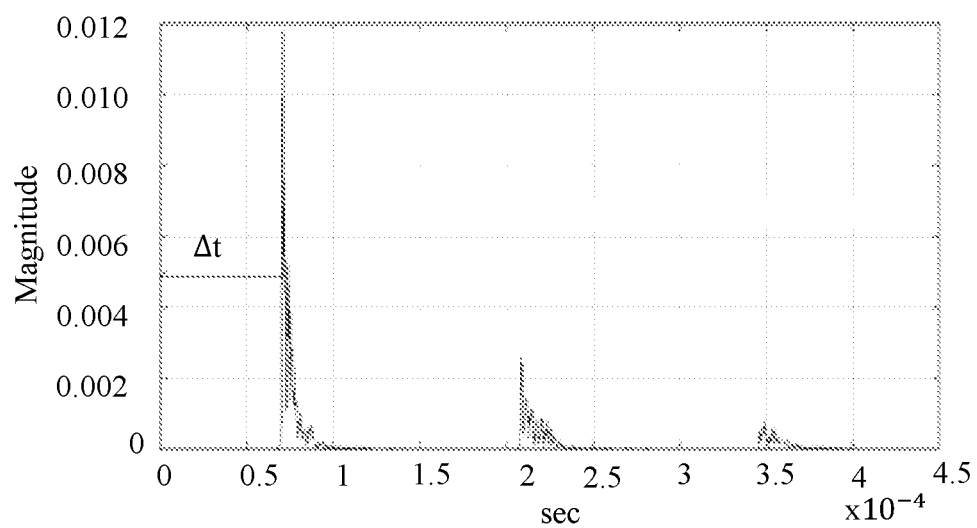
FIG. 7 illustrate a graph depicting results of time domain analysis of multi-sensory techniques for measuring average temperature of mixed fluid inside a chamber, in accordance with some embodiments of the present disclosure.

In an embodiment, the average velocity of the sound signal is also obtained based on time domain analysis by simultaneously performing complex Fourier transform on an in-phase part and a quadrature part of the signal received by the second transducer to provide a time domain signal as shown in FIG. 7. FIG. 6A illustrate a graph depicting the in-phase part of the signal received by the second transducer, in accordance with some embodiments of the present disclosure. FIG. 6B illustrates a graph depicting the quadrature part of the signal received by the second transducer, in accordance with some embodiments of the present disclosure. As can be seen in FIGS. 6A and 6B, a relationship between amplitude and frequency of the signal received by the second transducer is provided. FIG. 7 illustrate a graph depicting results of time domain analysis of multi-sensory techniques for measuring average temperature of mixed fluid inside a chamber, in accordance with some embodiments of the present disclosure. In an embodiment, the time domain signal is represented by a series of echoes as shown FIG. 7. Here the first peak occurrence $\Delta t$ as depicted in FIG. 7 carries the velocity information. Further, the value of average velocity of the sound signal from time domain information is obtained based on chamber dimension (D) and the first peak occurrence $\Delta t$ as shown in equation 2 below as:

$$V_{av} = \frac{D}{\Delta t} \qquad (2)$$

Referring back to FIG. 3, at step 308, the one or more hardware processors 206 are configured to determine, using one or more sensors, concentration of one or more fluids present inside the chamber. In an embodiment, the one or more sensors could be but not limited to a chemical sensor, and a gas sensor. Further, if $A_1, A_2, A_3 \ldots A_n$ denote the concentration (in terms of fraction or percentage) of different fluid ($F_1, F_2, F_3 \ldots F_n$) present at any instantaneous time, then the total concentration (in terms of fraction or percentage) of the present fluid should be equal to one as shown in equation 3 below:

$$A_1 + A_2 + A_3 + \ldots + A_n = 1 \qquad (3)$$

Further, for each fluid ($F_1, F_2, F_3 \ldots F_n$) at different temperatures, fluid density and compressibility is calculated and stored in look up table format. In other words, in the presence of one or more fluid inside the chamber, a temperature versus fluid density data is created and stored in a look-up table format for every specific fluid inside the chamber. The look up table of temperature versus fluid density data is shown below in Table 1 as:

TABLE 1

|       | $T_1$      | $T_2$      | $T_m$      |
|-------|------------|------------|------------|
| $F_1$ | $\rho_{11}$ | $\rho_{12}$ | $\rho_{1m}$ |
| $F_2$ | $\rho_{21}$ | $\rho_{22}$ | $\rho_{2m}$ |
| $F_n$ | $\rho_{n1}$ | $\rho_{n2}$ | $\rho_{nm}$ |

In a similar way, in the presence of one or more fluid inside the chamber, a temperature versus fluid compressibility data is created and stored in the look-up table format for every specific fluid inside the chamber. The look up table of temperature versus fluid compressibility data is shown below in Table 2 as:

TABLE 2

|       | $T_1$         | $T_2$         | $T_m$         |
|-------|---------------|---------------|---------------|
| $F_1$ | $\kappa_{11}$ | $\kappa_{12}$ | $\kappa_{1m}$ |
| $F_2$ | $\kappa_{21}$ | $\kappa_{22}$ | $\kappa_{2m}$ |
| $F_n$ | $\kappa_{n1}$ | $\kappa_{n2}$ | $\kappa_{nm}$ |

Further, using Table 1 and determined concentration of the one or more fluids ($A_1, A_2, \ldots A_n$) at different temperatures ($T_1, T_2, \ldots T_n$), a resultant fluid density is computed based on a urick model using equation (4) shown below as:

$$\rho_e(T_m) = A_1 \rho_{1m} + A_2 \rho_{2m} + \ldots A_n \rho_{nm} \qquad (4)$$

Similarly, using Table 2 and determined concentration of the one or more fluids ($A_1, A_2, \ldots A_n$) at different temperatures ($T_1, T_2, \ldots T_n$), a resultant fluid compressibility is computed based on a urick model using equation (5) shown below as:

$$\kappa_e(T_m) = A_1 \kappa_{1m} + A_2 \kappa_{2m} + \ldots A_n \kappa_{nm} \qquad (5)$$

Further, as depicted in step 310 of FIG. 3, the one or more hardware processors 206 are configured to compute, using the one or more look up tables, a theoretical value of the velocity of sound signal inside the chamber based on the concentration of the one or more fluids at different temperatures. In an embodiment, response of the one or more sensors provides information pertaining to presence of one or more fluids in fraction or percentage form which is successively fed to the one or more hardware processors 206. For example, if a chamber comprises oxygen carbon-dioxide, and nitrogen oxide, then the relative percentage of oxygen (say 50%), carbon-dioxide (say 30%), and nitrogen oxide (say 20%) is determined. The one or more hardware processors 206 retrieve the one or more lookup tables to calculate the theoretical value of the velocity of sound signal. In an embodiment, the theoretical value of the velocity of sound signal at any instantaneous time is computed using equation (6) shown below as:

$$V_t = \frac{1}{\sqrt{\rho_e(T_m)\kappa_e(T_m)}} \tag{6}$$

Here, $V_t$ denotes theoretical value of velocity of sound signal, $\rho_e$ denotes the resultant fluid density and $\kappa_e$ denotes the resultant fluid compressibility at different temperatures and $(T_m)$ denotes the $m^{th}$ value of temperature.

Further, as depicted in step 312 Of FIG. 3, the one or more hardware processors 206 are configured to determine an average temperature of the mixed fluid in the chamber by comparing the theoretical value and the obtained value of sound signal. In an embodiment, the one or more hardware processors 206 iteratively perform comparison of the calculated theoretical value of velocity of sound signal as shown in equation 6 with the value of average velocity of the sound signal determined based on acoustic interferometry to obtain a match at different temperatures. In an embodiment, temperature in the chamber determined by the one or more hardware processors 206 corresponds to a temperature when difference between the theoretical value and the obtained value of velocity of sound signal is within pre-defined tolerance limit. In other words, temperature where the difference between the theoretical and the average velocity of sound signal is within the pre-defined tolerance limit ($\Delta e$) is considered as the average temperature in the chamber. Here, the pre-defined tolerance limit is configurable and could be but not limited to 5% of the theoretical sound velocity. In an embodiment, the pseudo code for determining average temperature of the mixed fluid in the chamber is provided below as:

1. Define tolerance=$\Delta e$
2. For all $T_n \varepsilon (T_{min}$ to $T_{max})$
3. Compute theoretical sound velocity $$V_t = \frac{1}{\sqrt{\rho_e(T_m)\kappa_e(T_m)}}$$

4. Determine value of average velocity of sound signal using $$V_{av} = 2*D*\Delta f \text{ or } V_{av} = \frac{D}{\Delta t}$$

5. Compute error, error=abs $(V_t-V_{av})$
6. Check for error $\leq \Delta e$
7. end for
8. repeat step 1 to step 6 till error$\leq \Delta e$
9. Report the temperature $T_m$ when error is $\leq \Delta e$ In an embodiment, the one or more hardware processors 206 are further configured to continuously determine an updated temperature of the mixed fluid in the chamber by identifying a presence of at least one of (i) noise, (ii) fumes, (iii) turbulence in the chamber based on a shift in frequency of a radar. In accordance with Doppler principle, a shift in the frequency of a radar occurs due to presence of noise, turbulences presence inside the chamber. Thus a radar (e.g., Doppler radar) is used to measure the presence or absence of noise, fumes and turbulences by bouncing a microwave signal off a desired target and analyzing how the object's motion has altered the frequency of the returned signal. In this case, the desired target includes moving gas particles, wherein the movement of gas particles is caused by the noise, turbulence or fumes inside the chamber. In other words, the radar detects the presence of noise, fumes and the turbulence based on the movement of gas particles.

In an embodiment, the presence of at least one of (i) noise, (ii) fumes, (iii) turbulence in the chamber is identified by comparing the shift in the frequency of the radar with a pre-determined threshold. In an embodiment, the pre-determined threshold is a Doppler frequency $f_d$ which is calculated in equation 5 below as:

$$f_d = \frac{2v}{\lambda}\cos(\alpha) \tag{5}$$

Here, $f_d$ denotes Doppler frequency, $\lambda$ denotes wavelength of microwave signal transmitted by the radar, v denotes speed of gas particles, and $\alpha$ denotes an angle between transmitted microwave signal and direction of target. In an embodiment, the shift in the frequency of radar becomes equal to or more than the Doppler frequency when noise or fumes or turbulence is present inside the chamber. In other words, turbulence, noise or fumes are identified inside the chamber whenever the Doppler frequency is present.

In an embodiment, whenever the at least one of (i) noise, (ii) fumes, (iii) turbulence is identified in the chamber, then the corresponding acoustic interferometry based information is not considered for determining temperature. In an embodiment, the step of identifying presence of the at least one of (i) noise, (ii) fumes, (iii) turbulence in the chamber is continuously and simultaneously performed with the step of obtaining the value of average velocity of the sound signal based on acoustic interferometry technique. Initially, the acoustic interferometry technique is performed to obtain the value of average velocity of sound signal without having knowledge of noise. As radar detects the presence of noise, fumes or turbulences, the one or more hardware processors 206 drops the corresponding temperature reading determined based on obtained average velocity of the sound signal and considers next temperature reading. In other words, it is observed that the presence of turbulence or fumes or noise present in the chamber lead to obtaining inaccurate value of average velocity of sound signal, thereby may determine incorrect average temperature in the chamber. So, the interferometry based information such as the value of average velocity of sound signal determined at the same time when fumes or noise or turbulence in the chamber are identified, is not considered for temperature measurement. Thus, the temperature of the mixed fluid in the chamber is continuously updated based upon consideration and non-consideration of velocity information of the sound signal obtained using acoustic interferometry based technique.

Experimental Results:

In an embodiment, it is observed that for a priory known mixed fluid (if the type of fluid is already known) comprising water (96%) and alcohol (4%), the temperature can be estimated from obtained value of average velocity of sound signal. In the system of the present disclosure, for proof of concept (POC), the temperature measurement is carried inside a closed chamber of dimension 10 centimeters, with 96% water and 4% alcohol as mixed fluid. Table 3 provides experimental results in terms of actual temperature of the mixed fluid inside the chamber measured using a thermocouple and the temperature measured using the method of present disclosure at different time instants.

TABLE 3

| Actual temperature in ° C. (Ground truth temperature) measured using thermocouple | Temperature measured using the method of present disclosure(° C.) |
|---|---|
| 15.25 | 11.2 |
| 23.75 | 19.5 |
| 29.05 | 24.4 |
| 34.75 | 29.8 |
| 40.25 | 34.5 |
| 44.75 | 38.3 |
| 50 | 41.8 |
| 55.05 | 44.5 |
| 60.25 | 48.6 |

Figure 8:
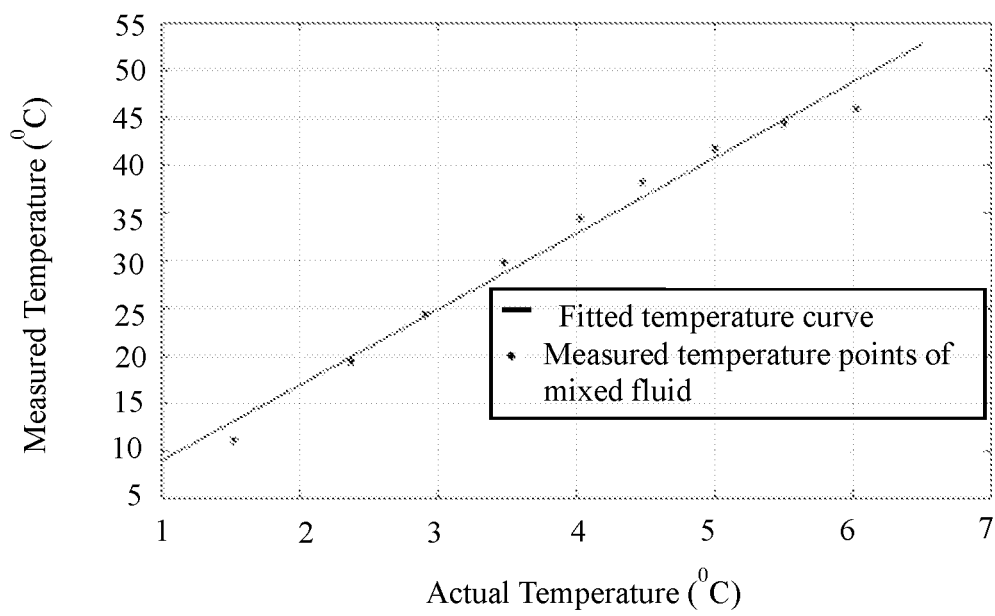
FIG. 8 illustrates a graph depicting experimental results of multi-sensory techniques for measuring average temperature of mixed fluid inside a chamber, in accordance with some embodiments of the present disclosure.

FIG. 8 illustrates a graph depicting experimental results of multi-sensory techniques for measuring average temperature of mixed fluid inside a chamber, in accordance with some embodiments of the present disclosure. As can be seen in FIG. 8, a graph depicting relationship of actual temperature (ground truth temperature) with the measured temperature of the mixed fluid is plotted based on the values provided in Table 3. It can be observed from FIG. 8 that measured temperature follows the actual temperature with an accuracy of 93%.

The proposed method provides accurate measurement of average temperature of fluid that contains mixture of different compositions and eliminates the effect of noise, fumes, and turbulence present inside the chamber on temperature measurement.

The illustrated steps of method 200 is set out to explain the exemplary embodiments shown, and it should be anticipated that ongoing technological development may change the manner in which particular functions are performed. These examples are presented herein for purposes of illustration, and not limitation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A processor-implemented method, comprising:
    generating, by exciting a first transducer in a frequency sweep mode, a sound signal to be transmitted to a second transducer in a mixed fluid medium inside a chamber;
    generating, based on transmission of the sound signal, a superimposed standing wave signal between the first transducer and the second transducer;
    analyzing, using an acoustic interferometry technique, one or more features of the superimposed standing wave signal to obtain a value of average velocity of the sound signal in the mixed fluid medium inside the chamber;

determining, using one or more sensors, concentration of one or more fluids present inside the chamber;

computing, using one or more look up tables, a theoretical value of the velocity of sound signal inside the chamber based on the concentration of the one or more fluids at different temperatures;

determining average temperature of mixed fluid in the chamber by comparing the theoretical value and the obtained value of sound signal;

continuously determining an updated temperature of the mixed fluid in the chamber by identifying a presence of at least one of (i) noise, (ii) fumes, and (iii) turbulence in the chamber based on a shift in frequency of a radar, wherein the presence of at least one of (i) noise, (ii) fumes, (iii) turbulence in the chamber is identified by comparing the shift in the frequency of the radar with a pre-determined threshold and bouncing a microwave signal off a desired target and analyzing motion of an object to check how motion of the object has altered frequency of a returned signal and whenever the at least one of (i) noise, (ii) fumes, (iii) turbulence is identified in the chamber, then corresponding acoustic interferometry based information is not considered for determining temperature and wherein acoustic interferometry technique is performed to obtain the value of average velocity of sound signal without having knowledge of the noise.

2. The method of claim 1, wherein the one or more features of the superimposed standing wave signal include peak to peak based resonance difference.

3. The method of claim 1, wherein the first transducer is a speaker and the second transducer is a microphone.

4. A system, comprising:
a memory;
one or more communication interfaces; and
one or more hardware processors coupled to said memory through said one or more communication interfaces, wherein said one or more hardware processors are configured to:
generate, by exciting a first transducer in a frequency sweep mode, a sound signal to be transmitted to a second transducer in a mixed fluid medium inside a chamber;
generate, based on transmission of the sound signal, a superimposed standing wave signal between the first transducer and the second transducer;
analyze, using an acoustic interferometry technique, one or more features of the superimposed standing wave signal to obtain a value of average velocity of the sound signal in the mixed fluid medium inside the chamber;
determine, using one or more sensors, concentration of one or more fluids present inside the chamber;
compute, using one or more look up tables, a theoretical value of the velocity of sound signal inside the chamber based on the concentration of the one or more fluids at different temperatures;
determine average temperature of mixed fluid in the chamber by comparing the theoretical value and the obtained value of sound signal;
continuously determine an updated temperature of the mixed fluid in the chamber by identifying a presence of at least one of (i) noise, (ii) fumes, (iii) turbulence in the chamber based on a shift in frequency of a radar, wherein the presence of at least one of (i) noise, (ii) fumes, (iii) turbulence in the chamber is identified by comparing the shift in the frequency of the radar with a pre-determined threshold and bouncing a microwave signal off a desired target and analyzing motion of an object to check how motion of the object has altered frequency of a returned signal and whenever the at least one of (i) noise, (ii) fumes, (iii) turbulence is identified in the chamber, then corresponding acoustic interferometry based information is not considered for determining temperature and wherein acoustic interferometry technique is performed to obtain the value of average velocity of sound signal without having knowledge of the noise.

5. The system of claim 4, wherein the one or more features of the superimposed standing wave signal include peak to peak based resonance difference.

6. The system of claim 4, wherein the first transducer is a speaker and the second transducer is a microphone.

7. One or more non-transitory machine readable information storage mediums comprising one or more instructions which when executed by one or more hardware processors cause:
generating, by exciting a first transducer in a frequency sweep mode, a sound signal to be transmitted to a second transducer in a mixed fluid medium inside a chamber;
generating, based on transmission of the sound signal, a superimposed standing wave signal between the first transducer and the second transducer;
analyzing, using an acoustic interferometry technique, one or more features of the superimposed standing wave signal to obtain a value of average velocity of the sound signal in the mixed fluid medium inside the chamber;
determining, using one or more sensors, concentration of one or more fluids present inside the chamber;
computing, using one or more look up tables, a theoretical value of the velocity of sound signal inside the chamber based on the concentration of the one or more fluids at different temperatures;
determining average temperature of mixed fluid in the chamber by comparing the theoretical value and the obtained value of sound signal;
continuously determining an updated temperature of the mixed fluid in the chamber by identifying a presence of at least one of (i) noise, (ii) fumes, (iii) turbulence in the chamber based on a shift in frequency of a radar, wherein the presence of at least one of (i) noise, (ii) fumes, (iii) turbulence in the chamber is identified by comparing the shift in the frequency of the radar with a pre-determined threshold and bouncing a microwave signal off a desired target and analyzing motion of an object to check how motion of the object has altered frequency of a returned signal and whenever the at least one of (i) noise, (ii) fumes, (iii) turbulence is identified in the chamber, then corresponding acoustic interferometry based information is not considered for determining temperature and wherein acoustic interferometry technique is performed to obtain the value of average velocity of sound signal without having knowledge of the noise.

8. The one or more non-transitory machine readable information storage mediums of claim 7, wherein the one or more features of the superimposed standing wave signal include peak to peak based resonance difference.

9. The one or more non-transitory machine readable information storage mediums of claim 7, wherein the first transducer is a speaker and the second transducer is a microphone.

\* \* \* \* \*